(12) United States Patent
Goto et al.

(10) Patent No.: US 6,720,113 B2
(45) Date of Patent: Apr. 13, 2004

(54) SOLID ELECTROLYTE CELL

(75) Inventors: Shuji Goto, Kanagawa (JP); Mamoru Hosoya, Kanagawa (JP); Takahiro Endo, Kanagawa (JP)

(73) Assignee: Sony Corporation, Tokyo (JP)

( * ) Notice: Subject to any disclaimer, the term of this patent is extended or adjusted under 35 U.S.C. 154(b) by 149 days.

(21) Appl. No.: 09/966,864

(22) Filed: Sep. 28, 2001

(65) Prior Publication Data

US 2002/0094481 A1 Jul. 18, 2002

(30) Foreign Application Priority Data

Oct. 5, 2000 (JP) ..................... P2000-306876

(51) Int. Cl.$^7$ ................................ H01M 4/58
(52) U.S. Cl. ............... 429/231.95; 429/231.9; 429/218.1
(58) Field of Search .............. 429/231.95, 218.1, 429/231.9

(56) References Cited

U.S. PATENT DOCUMENTS 6,528,033 B1 * 3/2003 Barker et al. ............... 423/306

\* cited by examiner

*Primary Examiner*—Patrick Ryan
*Assistant Examiner*—Angela J Martin
(74) *Attorney, Agent, or Firm*—Sonnenschein, Nath & Rosenthal LLP

(57) ABSTRACT

A solid electrolyte cell in which cell characteristics are not deteriorated even on overdischarge to the cell voltage of 0V, such that the shape of the cell encapsulated in the laminate film is maintained. The cell includes a cathode containing a compound represented by the general formula $Li_xFe_{1-y}M_yPO_4$ where $0.05 \leq x \leq 1.2$, $0 \leq y \leq 0.8$, and M is at least one selected from the group consisting of Mn, Cr, Co, Cu, Ni, V, Mo, Ti, Zn, Al, Ga, Mg, B and Nb, an anode and a solid electrolyte. An electrode unit 1 comprised of the cathode and the anode layered together with interposition of the solid electrolyte is encapsulated with a laminate film 2.

4 Claims, 5 Drawing Sheets

SOLID ELECTROLYTE CELL

RELATED APPLICATION DATA

The present application claims priority to Japanese Application(s) No(s). P2000-306876 filed Oct. 6, 2000, which application(s) is/are incorporated herein by reference to the extent permitted by law.

BACKGROUND OF THE INVENTION

1. Field of the Invention

This invention relates to a solid electrolyte cell having an electrode unit comprised of a cathode and an anode layered together with the interposition of a solid electrolyte.

2. Description of Related Art

Recently, a variety of portable electronic equipment, such as a video tape recorder with a built-in camera, a portable telephone set or a portable computer, have made their debut. Since it is envisaged to reduce the size and the thickness of these electronic equipment, a demand is raised for reducing the size and the weight of a cell used as a driving power source for the electronic equipment.

As a cell coping with this demand, a non-aqueous electrolyte cell which is made up of a cathode and an anode, capable of reversibly doping or undoping lithium ions, and a non-aqueous electrolyte, and which has advantages such as high output or high energy density, that is a so-called lithium ion cell, was developed and put to practical use.

As the lithium ion cell, there is known a liquid-based lithium ion cell, including, as an ion conductor between the cathode and the anode, a porous high molecular separator impregnated with an electrolyte solution. In such liquid-based lithium ion cell, an electrode unit, comprised of a cathode and an anode, layered together with the interposition of a separator, is housed in a rigid metal can with a view to preventing leakage of the electrolyte solution.

A polymer lithium ion, having a solid electrolyte as an ion conductor between the cathode and the anode, referred to below simply as a solid electrolyte cell, has also been developed. In the solid electrolyte cell, a solid electrolyte, comprised of a lithium salt solid-dissolved in a polymer, and a gelated solid electrolyte, comprised of an electrolyte solution contained in a matrix polymer, is used. Since the solid electrolyte is superior in leakage proofness, it is unnecessary to use a metal. can as an exterior material for housing the electrode unit comprised of a cathode and an anode layered together with the interposition of a solid electrolyte, but a laminate film, for example, may be used. That is, the solid electrolyte cell has an advantage of simplifying the exterior material to reduce its size, weight and thickness.

Meanwhile, if a solid electrolyte cell employing a cathode active material of, for example, $LiCoO_2$, is discharged, the anode potential is changed to noble and reaches the value of 3.8 V (vsLi/Li$^+$), which is the same as the cathode potential, for the cell voltage of 0 V. On the other hand, the eluation potential of Cu, Ni etc used as the anode current collector is lower than 3.8 V (vsLi/Li$^+$), which is the discharge potential of $LiCoO_2$. Thus, in case the anode potential reaches the cathode discharge potential due to overdischarge, the anode current collector, formed by a foil of metal, such as Cu or Ni, is corroded.

If the anode current collector is corroded, the layer of an anode active material may be detached from the anode current collector, or metal ions, such as copper ions, dissolved from the anode current collector into the solid electrolyte, are precipitated during charging on the anode active material. This obstructs lithium intercalation in the anode and the normal anode operation to detract from the cell performance.

If the cell continues to be used under this condition, the solid electrolyte is decomposed during charging where the anode active material is detached on the anode current collector, or where copper is precipitated on the anode active material, so that gases are evolved due to this decomposition reaction. In a solid electrolyte cell in which an electrode unit is hermetically sealed with a laminate film, the gases evolved due to the decomposition reaction of the solid electrolyte are charged into the inside of the laminate film which is thereby swollen to increase the cell size to render it impossible to maintain the shell shape. In particular, if the gas is evolved in an excessive amount, there is a fear of cleavage of the laminate film due to gas charged therein.

Thus, in a solid electrolyte cell, there is provided a protection circuit for prohibiting overdischarge to the cell voltage of 0 V. However, it is up to the solid electrolyte cell to realize a high capacity as the limited cell shape is maintained, such that it is required to remove the protection circuit not contributing to the cell reaction in order to increase the charging volume of the active material. It is similarly requested to remove the protection circuit to reduce the weight of the solid electrolyte cell as well as to reduce its cost.

However, such a solid electrolyte cell in which cell characteristics are not deteriorated even on overdischarge to the cell voltage of 0 V, as the cell shape encapsulated in a laminate film remains unchanged, has not been developed, such that, in the current state of the art, it is not possible to remove the protective circuit from the solid electrolyte cell.

SUMMARY OF THE INVENTION

It is therefore an object of the present invention to provide a solid electrolyte cell which can be overdischarged to the cell voltage of 0 V.

The present invention provides a solid electrolyte cell including a cathode containing a compound represented by the general formula $Li_xFe_{1-y}M_yPO_4$ where $0.05 \leq x \leq 1.2$, $0 \leq y \leq 0.8$, and M is at least one selected from the group consisting of Mn, Cr, Co, Cu, Ni, V, Mo, Ti, Zn, Al, Ga, Mg, B and Nb, an anode, and a solid electrolyte, wherein an electrode unit comprised of the cathode and the anode are layered together with interposition of the solid electrolyte is encapsulated with a laminate film.

In the solid electrolyte cell according to the present invention, the discharge potential of the compound represented by the general formula $Li_xFe_{1-y}M_yPO_4$ is baser than the eluation potential of the metal material of the anode current collector, so that, even when the anode potential reaches the discharge potential of the cathode active material due to over discharge up to the cell voltage of 0 V, the anode current collector formed by a foil of metal, such as Cu or Ni, is not corroded, so that the solid electrolyte cell is not deteriorated in cell performance even on overdischarge, while it is able to maintain the cell shape encapsulated in the laminate film.

DESCRIPTION OF THE PREFERRED EMBODIMENTS

Figure 1:
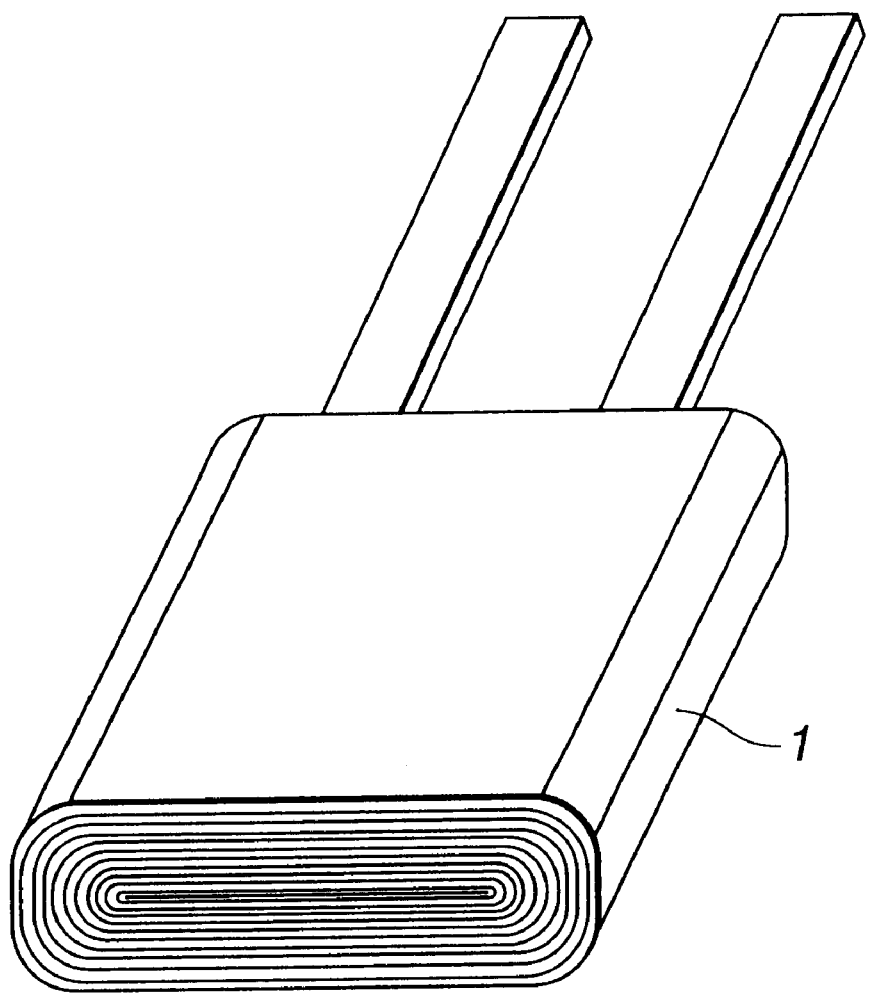
FIG. 1 schematically shows a wound electrode unit.

Referring to the drawings, preferred embodiments of the present invention will be explained in detail.

Figure 2:
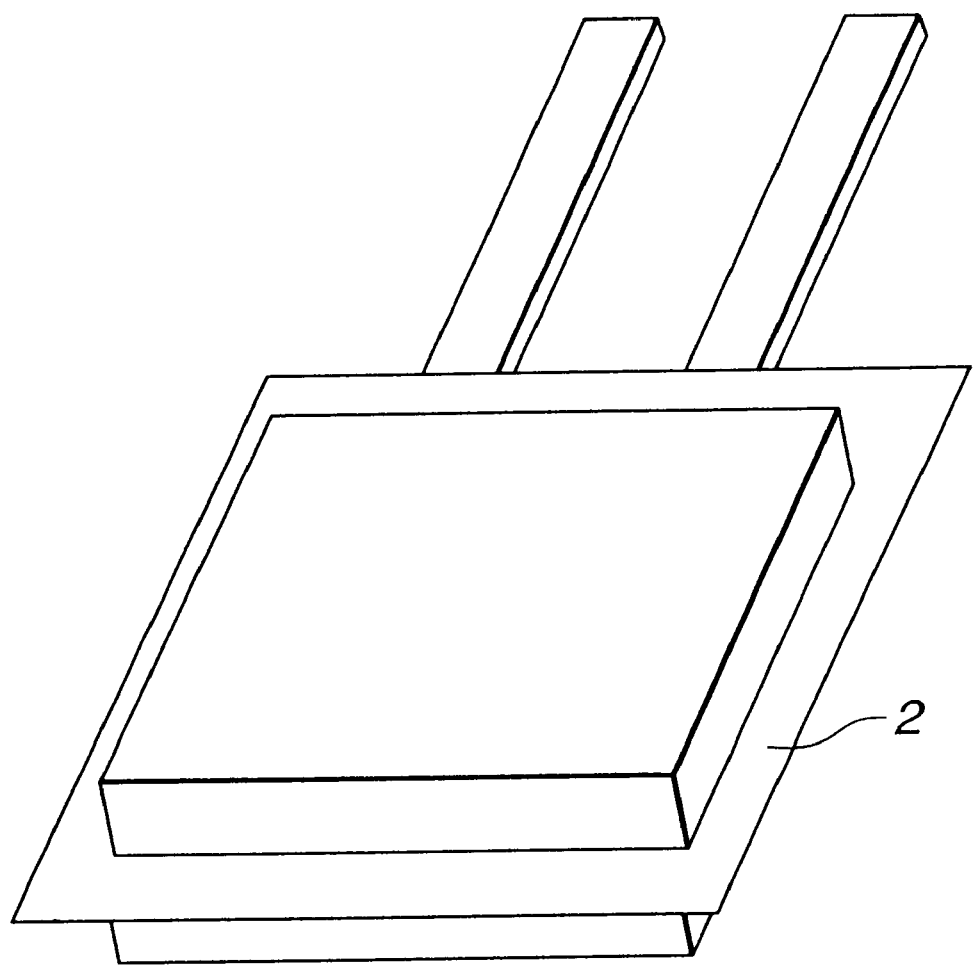
FIG. 2 schematically shows a solid electrolyte cell in which the wound electrode unit is encapsulated in a laminate film.

A solid electrolyte cell, embodying the present invention, includes a wound electrode unit 1 obtained on layering strip-shaped cathodes and anodes with a solid electrolyte in-between and longitudinally coiling the resulting laminated product as shown in FIG. 1. This solid electrolyte cell is encapsulated in a laminated film 2, as shown in FIG. 2.

Figure 3:
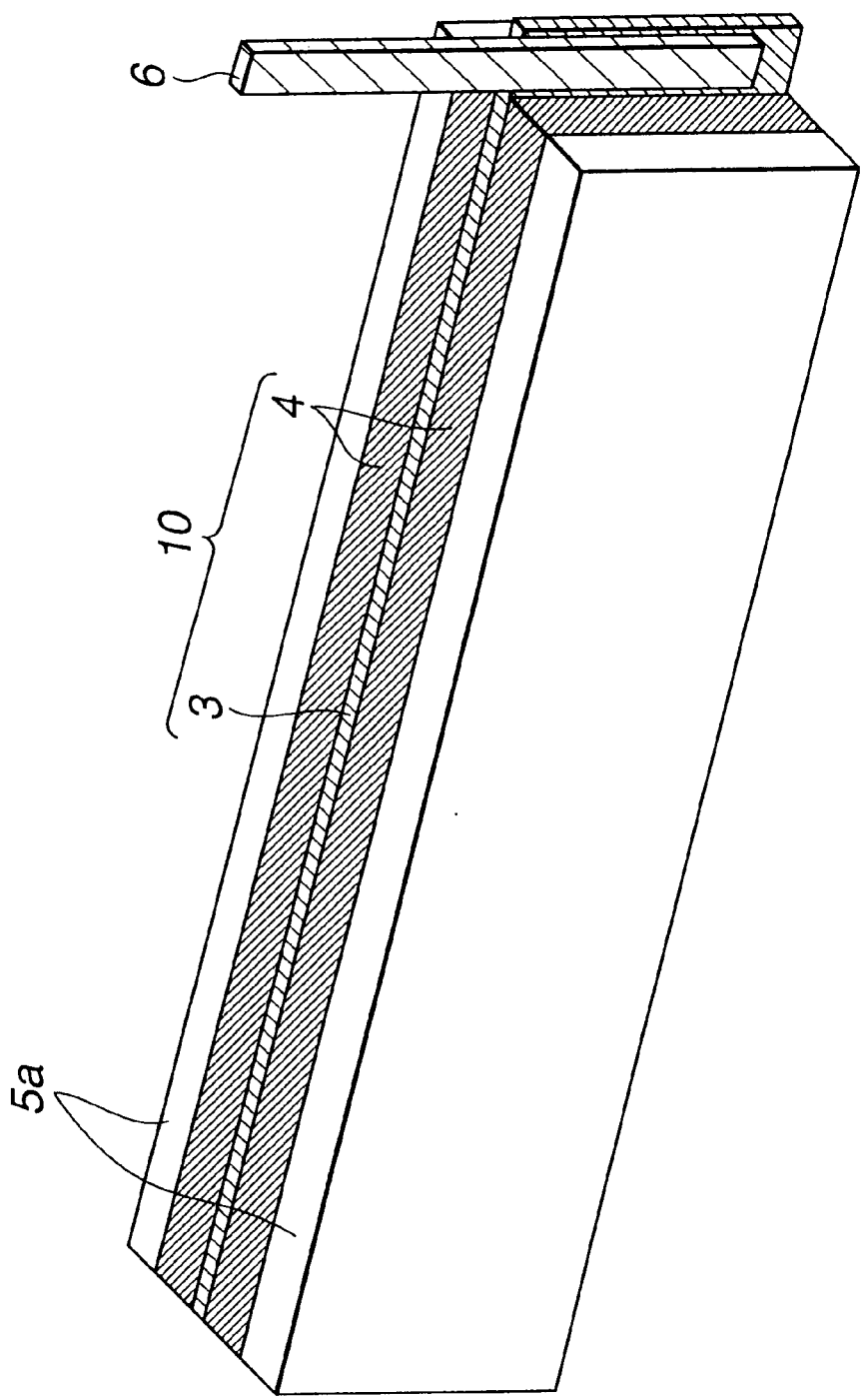
FIG. 3 schematically shows a cathode.
Figure 4:
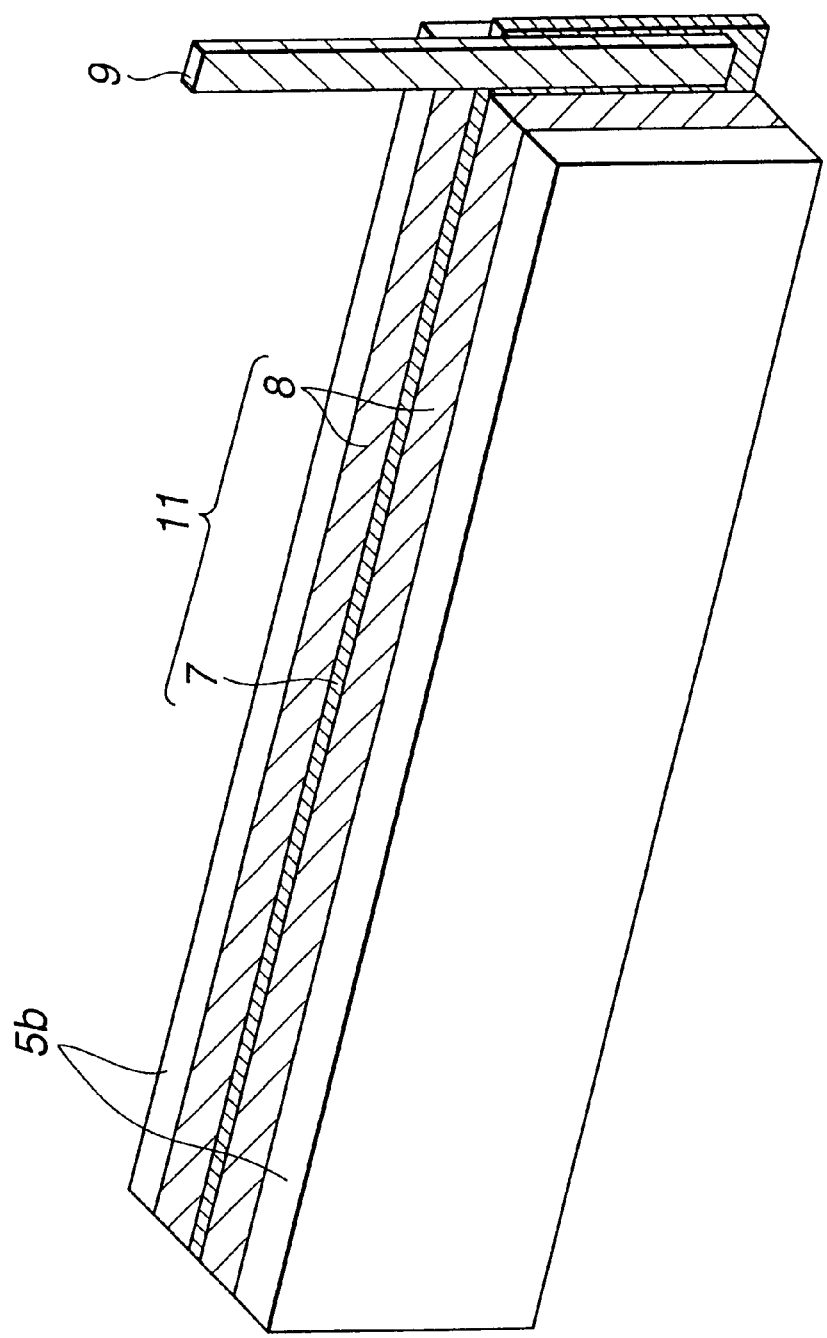
FIG. 4 schematically shows an anode.

The anode includes a layer of an anode active material 4, deposited on each side of an anode current collector 3, as shown in FIG. 3. A solid electrolyte layer 5a is formed on this layer of the anode active material 4. An anode lead 6 is connected to one end of the anode current collector 3. The anode current collector 3 may be formed by, for example, a foil of metal, such as copper or nickel.

The layer of the anode active material 4 may be prepared by coating an anode mixture, containing an anode active material and a binder, on the anode current collector 3, and drying the resulting product in situ.

As the anode active material, such a material that can be doped/undoped with lithium may be used. As these materials, pyrocarbons, cokes, carbon blacks, such as acetylene black, carbon materials, such as graphite, vitreous carbon, activated charcoal, carbon fibers, sintered organic high molecular materials, sintered coffee beans, sintered cellulose or sintered bamboo, lithium alloys and electrically conductive polymers, such as polyacetylene, may be used.

As the binder contained in the layer of the anode active material 4, any suitable known resin materials, routinely used as a binder for the layer of the anode active material 4 in this sort of the solid electrolyte cell, may be used.

The cathode is comprised of a layer of a cathode active material 8, formed on each side of a cathode current collector 7, and a solid electrolyte layer 5b formed on this layer of the cathode active material 8. A cathode lead 9 is connected to one end of the cathode current collector 7.

The cathode current collector 7 may be formed of, for example, a foil of metal, such as aluminum.

The layer of the cathode active material 8 may be formed on coating a cathode mixture, containing a cathode active material and a binder, on the cathode current collector 7, and drying the resulting product in situ.

The cathode active material preferably contains a compound of an olivinic crystal structure represented by the general formula $Li_xFe_{1-y}M_yPO_4$, where M is at least one selected from the group consisting of Mn, Cr, Co, Cu, Ni, V, Mo, Ti, Zn, Al, Ga, Mg, B and Nb, $0.05 \leq x \leq 1.2$ and $0 \leq y \leq 0.8$. In particular, the $Li_xFe_{1-y}M_yPO_4$ is $LiFePO_4$.

If the solid electrolyte cell employing e.g., only $LiCoO_2$ as the cathode active material, is overdischarged, the anode potential is changed to noble and reaches the value of 3.8 V (vsLi/Li$^+$), which is the same as the cathode potential, for the cell voltage of 0 V. On the other hand, the eluation potential of Cu, Ni etc used as the anode current collector is lower than 3.8 V (vsLi/Li$^+$), which is the discharge potential of $LiCoO_2$. Thus, in case the anode potential reaches the cathode discharge potential due to overdischarge, the anode current collector 3, formed by a foil of metal, such as Cu or Ni, is corroded.

If the anode current collector 3 is corroded, the layer of the anode active material 4 may be detached from the anode current collector 3 or metal ions, such as copper ions, dissolved from the anode current collector into the solid electrolyte, are precipitated during charging on the anode active material. This obstructs lithium intercalation in the anode and the normal anode operation to detract from the cell performance.

If the solid electrolyte cell continues to be used in this condition, the solid electrolyte layer 5 is decomposed where the anode active material is detached on the anode current collector, or where copper is precipitated on the anode active material, so that gases are evolved due to this decomposition reaction. In a solid electrolyte cell in which an electrode unit is hermetically sealed with a laminate film, the gases evolved due to the decomposition reaction of the solid electrolyte are charged into the inside of the laminate film which is thereby swollen to increase the cell size to render it impossible to maintain the shell shape. In particular, if the gas is evolved in an excessive amount, there is a fear of cleavage of the laminate film due to gas charged therein. Conversely, if $Li_xFe_{1-y}M_yPO_4$ is contained as the cathode active material, the cathode potential towards the end of the discharge period is 3.4 V (vsLi/Li$^+$) which is the discharge potential of $Li_xFe_{1-y}M_yPO_4$. That is, even if the cell is overdischarged up to the cell voltage of 0 V, the anode potential is necessarily baser than the eluation potential of Cu or Ni used as the anode current collector 3, and hence there is no risk of corrosion of the anode current collector 3 formed by a foil of metal, such as Cu or Ni.

So, even if the cell voltage is 0V due e.g., to overdischarge, the solid electrolyte cell is not deteriorated in performance and is able to maintain the shape of the cell encapsulated in a laminate film. Additionally, the solid electrolyte cell may be overdischarged up to the cell voltage of 0 V, and hence may be practically usable even in the absence of protective circuits.

Preferably, the cathode contains a cathode active material having a discharge potential nobler than that of the compound represented by the general formula $Li_xFe_{1-y}M_yPO_4$.

The discharge reaction of the solid electrolyte cell proceeds using cathode active materials contained in the cathode, beginning from the cathode active material having a higher discharge voltage. That is, the cell voltage of the solid electrolyte cell at the initial stage of the discharge reaction corresponds to a difference between the discharge voltage of the cathode active material having a nobler discharge potential and the anode potential, while that towards the end of discharge corresponds to the difference between the discharge voltage of the compound having the general formula of $Li_xFe_{1-y}M_yPO_4$ and the anode potential.

Thus, with the solid electrolyte cell, an average discharge potential can be higher by using, in combination, such cathode active material(s) the discharge potential of which is nobler than that of the compound represented by the general formula $Li_xFe_{1-y}M_yPO_4$.

31.

The cathode active material having a discharge potential nobler than that of the compound represented by the general formula $Li_xFe_{1-y}M_yPO_4$ may be exemplified by a compound represented by the general formula $Li_xCo_{1-y}M_yO_2$, where $0<x<2$, $0 \leq y<1$ and M is at least one selected from the group consisting of Ni, Fe, Mn, Cu, Zn, Al, Sn, B, Ga, Cr, V, Ti, Mo, W, Mg, Ca, Sr and Hb (referred to below as a lithium cobalt composite oxide), a compound represented by the general formula $Li_xNi_{1-y}M_yO_2$, where $0<x<2$, $0 \leq y<1$ and M is at least one selected from the group consisting of Co, Fe, Mn, Cu, Zn, Al, Sn, B, Ga, Cr, V, Ti, Mo, W, Mg, Ca, Sr and Hb (referred to below as a lithium nickel composite oxide), and a compound represented by the general formula $Li_xMn_{2-y}M_yO_4$, where $o<x<2$, $0 \leq y<2$ and M is at least one selected from the group consisting of Ni, Fe, Co, Cu, Zn, Al, Sn, B, Ga, Cr, V, Ti, Mo, W, Mg, Ca, Sr and Hb (referred to below as a lithium manganese composite oxide). Preferably, at least one of these compounds is contained in the cathode.

As the binder contained in the layer of the cathode active material 8, any suitable known resin materials, routinely used as the binder for the layer of the cathode active material 8 in this sort of the solid electrolyte cell, may be used.

As the solid electrolyte layer 5, a completely solid electrolyte, made up of an electrolyte salt and a matrix polymer, or a gelated electrolyte, made up of an electrolyte salt, a matrix polymer and a lubricating solvent, may be used.

As an electrolyte salt, $LiPF_6$, $LiAsF_6$, $LiBF_4$, $LiClO_4$, $LiCF_3SO_3$, $LiN(CF_3SO_2)_2$ or $LiC_4F_9SO_3$, may be used either singly or in combination.

As the matrix polymer, polyacrylonitrile, polyvinylidene fluoride, polytetrafluoroethyelne, polyethylene oxide, polypropylene oxide, polyphosphasen, polysiloxane, polyvinyl acetate, polyvinyl alcohol, polymethyl methacrylate, polyacrylic acid, polymethacrylic acid, styrene butadiene rubber, nitrile-butadiene rubber, polystyrene or polycarbonate, may be used.

As the lubricating solvent, non-aqueous solvents, such as ethylene carbonate, propylene carbonate, butylene carbonate, vinylene carbonate, γ-butyrolactone, γ-valerolactone, diethoxyethane, tetrahydrofuran, 2-methyl tetrahydrofuran, 1, 3-dioxane, methyl acetate, methyl propionate, dimethyl carbonate, diethyl carbonate or ethylmethyl carbonate, may be used. As the lubricating solvent, these non-aqueous solvents may be used either singly or in combination.

The aforementioned solid electrolyte cell may, for example, be prepared as follows.

First, a cathode mixture containing a compound represented by the general formula $Li_xFe_{1-y}M_yPO_4$, where $0.05 \leq x \leq 1.2$, $0 \leq y \leq 0.8$ and M is at least one selected from the group consisting of Mn, Cr, Co, Cu, Ni, V, Mo, Ti, Zn, Al, Ga, Mg, B and Nb and also containing an electrification agent and a binder, is evenly coated on both sides of the cathode current collector 7 and subsequently dried to form a layer of a cathode active material 8 on the cathode current collector 7. The resulting product then is pressed by a roll press to form a cathode sheet.

The anode mixture, containing the anode active material and the binder, is evenly coated on both surfaces of the anode current collector 3 and dried in situ to form the layer of the anode active material 4. The resulting product then is pressed on a roll press to form an anode sheet.

A sol-like electrolyte solution containing an electrolyte salt or an electrolyte solution composed of a non-aqueous solvent and an electrolyte salt, a matrix polymer and a casting solvent, is evenly coated on both sides of a cathode sheet and an anode sheet, and dried in situ to remove the casting solvent to form the solid electrolyte layer 5 on the layer of the cathode active material 8 and on the layer of the anode active material 4.

The cathode sheet, now carrying the solid electrolyte layer 5b, is sliced e.g., in a strip. The solid electrolyte layer 5b and the layer of the cathode active material 8 are scraped off at a site of welding of a cathode lead 9 and the cathode lead 9 is welded thereat to fabricate a strip-shaped cathode.

The anode sheet, now carrying the solid electrolyte layer 5a, is sliced e.g., in a strip. The solid electrolyte layer 5b and the layer of the anode active material 4 are scraped off at a site of welding of an anode lead 6 and the anode lead 6 is welded thereat to fabricate a strip-shaped anode.

The strip-shaped cathode and the strip-shaped anode, carrying the solid electrolyte layer 5, are layered together to form a layered unit which then is wound a number of turns in the longitudinal direction to produce a wound electrode unit 1.

The wound electrode unit 1 is wrapped in a laminate film 2 and an outer rim of this film is thermally fused under reduced pressure for sealing. The wound electrode unit 1 is encapsulated in this manner in the laminate film 2 to produce a solid electrolyte cell.

Figure 5:
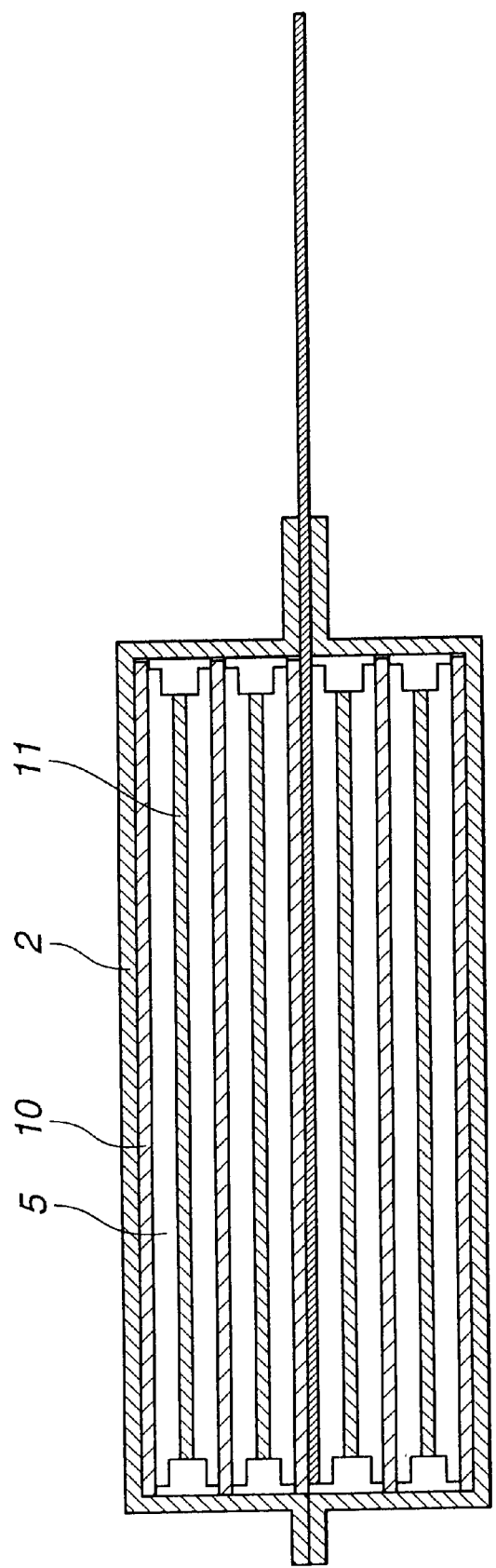
FIG. 5 is a cross-sectional view showing a solid electrolyte cell.

FIG. 5 shows a cross-section of the solid electrolyte cell parallel to the anode lead 6 and the cathode lead 9. As shown in FIG. 5, the wound electrode unit 1 is comprised of a laminated unit of the anode 10 and the cathode 11, layered together with the interposition of the solid electrolyte layer 5, and wound a number of turns in the longitudinal direction.

With the above-described solid electrolyte cell, containing the compound represented by the general formula $Li_xFe_{1-y}M_yPO_4$, as the cathode active material, the anode current collector 3 formed by a foil of metal, such as Cu or Ni, is safeguarded against corrosion even if the cell is overdischarged up to cell voltage of 0 V. So, the cell performance is not deteriorated, while the cell shape encapsulated in the laminate film is maintained. That is, the present solid electrolyte cell can be overdischarged up to cell voltage of 0 V.

There is no limitation to the shape of the solid electrolyte cell 1, such that it may be of a cylindrical, square or any other shape, while it may also be of variable size, such as thin type or large format. The present invention is also applicable to a primary cell or to a secondary cell.

EXAMPLES

The present invention is hereinafter explained based on specified experimental results.

Sample 1

Preparation of Cathode

Preparation of Cathode Mixture

First, the following respective components of the cathode mixture were weighed out in accordance with the following composition:

| | |
|---|---|
| cathode active material: $LiFePO_4$ | 90 parts by weight |
| electrification agent: graphite | 6 parts by weight |
| binder: polyvinylidene fluoride | 4 parts by weight | these components being then dispersed in N-methyl pyrrolidone to prepare a slurried cathode mixture.

The so prepared cathode mixture was evenly coated on both sides of the cathode current collector, 20 μm in thickness, formed by an aluminum foil. The layer of the cathode active material in a wet state is dried and pressed in a roll press to form a cathode sheet.

Preparation of Electrolyte Solution

First, respective components of a plasticizer, forming the gelated electrolyte, were weighed out in accordance with the following composition:

| lubricating solvent: ethylene carbonate | 42.5 parts by weight |
| : propylene carbonate | 42.5 parts by weight |
| electrolyte salt: LiPF$_6$ | 15 parts by weight. |

These components were then mixed to prepare a plasticizer. 30 parts by weight of the plasticizer, 10 parts by weight of the matrix polymer and 60 parts by weight of tetrahydrofuran were mixed together and dissolved to prepare a sol-like electrolyte solution. As a matrix polymer, a copolymer of vinylidene fluoride and hexafluoropropylene with a polymerization ratio of 97:3 was used.

The sol-like electrolyte solution, thus prepared, was coated on the layer of a cathode active material to prepare an electrolyte coating film. The electrolyte coating film in the wet state was dried and freed of tetrahydrofuran to form a layer of a gelated sold electrolyte, 100 μm in thickness, on the cathode active material.

The cathode sheet, carrying the gelated sold electrolyte layer, was cut to form a strip-shaped cathode 50 mm×260 mm having a lead weld 50 mm×5 mm. As for the lead weld, the gelated sold electrolyte layer and the cathode active material layer were scraped off and an aluminum lead was welded at the scraped portion to form a cathode terminal.

Preparation of Anode
Preparation of Anode Mixture

First, the following components of the anode mixture were weighed out in accordance with the following composition:

| anode active material: graphite | 90 parts by weight |
| binder: polyvinylidene fluoride | 10 parts by weight |

These respective components then were dispersed in N-methyl pyrrolidone to form a slurried anode mixture.

The so prepared anode mixture was evenly coated on both sides of the anode current collector formed by a copper foil 10 μm in thickness to form a layer of an anode active material. The layer of the anode active material, in the wet state, was dried and pressed in a roll press to form an anode sheet.

A layer of a gelated solid electrolyte, 100 μm in thickness, was formed on the anode active material, by a method similar to the method of forming the layer of the gelated solid electrolyte formed on the cathode active material.

The anode sheet, now carrying the gelated solid electrolyte layer, was cut to form a strip-shaped anode having a size of 52 mm by 300 mm and having a lead weld having a size of 52 mm by 5 mm. As for the lead weld, the layer of the gelated solid electrolyte and the layer of the anode active material were scraped off and a nickel lead was welded in position to form an anode terminal.

Preparation of Solid Electrolyte Cell

The strip-shaped cathode and anode, carrying the layer of the gelated solid electrolyte, were layered together to form a layered product, which then was coiled in the longitudinal direction to form a wound electrode unit.

For encapsulating the wound electrode unit, it was wrapped up in a laminate film, which then has its rim heat fused under reduced pressure for sealing. The wound electrode unit was encapsulated in this manner in the laminate film to fabricate the solid electrolyte cell having the gelated solid electrolyte. As the laminate film, an aluminum laminate film comprised of nylon, aluminum and polypropylene layers, 25 μm, 40 μm and 30 μm in thickness, respectively, looking sequentially from the outermost layer, was used.

The solid electrolyte cell was prepared as described above. The cathode and anode terminals are held at sealing portions of the laminate film.

Sample 2

A solid electrolyte cell having a gelated solid electrolyte was prepared in the same way as in sample 1, except adding, in preparing the cathode mixture, 63 parts by weight of LiCoO$_2$ and 27 parts by weight of LiFePO$_4$ as the cathode active material.

Sample 3

A solid electrolyte cell having a gelated solid electrolyte was prepared in the same way as in sample 1, except adding, in preparing the cathode mixture, 63 parts by weight of LiCoO$_2$ and 27 parts by weight of LiFe$_{0.9}$Mn$_{0.1}$PO$_4$ as the cathode active material.

Sample 4

A solid electrolyte cell having a gelated solid electrolyte was prepared in the same way as in sample 1, except adding, in preparing the cathode mixture, 63 parts by weight of LiCo$_{0.98}$Al$_{0.01}$Ni$_{0.01}$O$_2$ and 27 parts by weight of LiFePO$_4$ as the cathode active material.

Sample 5

A solid electrolyte cell having a gelated solid electrolyte was prepared in the same way as in sample 1, except adding, in preparing the cathode mixture, 63 parts by weight of LiCo$_{0.98}$Al$_{0.01}$Ni$_{0.01}$O$_2$ and 27 parts by weight of LiFe$_{0.9}$Mn$_{0.1}$PO$_4$ as the cathode active material.

Sample 6

A solid electrolyte cell having a gelated solid electrolyte was prepared in the same way as in sample 1, except adding, in preparing the cathode mixture, 63 parts by weight of LiNiO$_2$ and 27 parts by weight of LiFePO$_4$ as the cathode active material.

Sample 7

A solid electrolyte cell having a gelated solid electrolyte was prepared in the same way as in sample 1, except adding, in preparing the cathode mixture, 63 parts by weight of LiNi$_{0.9}$Co$_{0.1}$O$_2$ and 27 parts by weight of LiFePO$_4$ as the cathode active material.

Sample 8

A solid electrolyte cell having a gelated solid electrolyte was prepared in the same way as in sample 1, except adding, in preparing the cathode mixture, 63 parts by weight of LiMn$_2$O$_4$ and 27 parts by weight of LiFePO$_4$ as the cathode active material.

Sample 9

A solid electrolyte cell having a gelated solid electrolyte was prepared in the same way as in sample 1, except adding, in preparing the cathode mixture, 63 parts by weight of LiMn$_{1.95}$Fe$_{0.05}$O$_4$ and 27 parts by weight of LiFePO$_4$ as the cathode active material.

Sample 10

A solid electrolyte cell having a gelated solid electrolyte was prepared in the same way as in sample 1, except adding, in preparing the cathode mixture, 90 parts by weight of LiFe$_{0.9}$Mn$_{0.1}$PO$_4$, as the cathode active material.

Sample 11

In preparing an electrolyte solution, 91 parts by weight of polyethylene oxide, having a molecular weight of 500,000, 9 parts by weight of LiClO$_4$, and acetonitrile were mixed together and dissolved to form a sol-like electrolyte solution. This electrolyte solution was then coated on the cathode active material and on the anode active material to form an electrolyte coating film. The electrolyte coating film in the wet state was dried in situ to remove acetonitrile to form a completely solid electrolyte layer, 100 μm thick, on the cathode active material and anode active material. In other respects, the method similar to that for preparing the sample 1 was used to fabricate the solid electrolyte cell.

Comparative Example 1 (Sample 12)

A solid electrolyte cell having a gelated solid electrolyte was prepared in the same way as in sample 1, except adding 90 parts by weight of $LiCoO_2$ as cathode active material, in the preparation of a cathode mixture.

Comparative Example 2 (Sample 13)

A solid electrolyte cell was prepared in the same way as in sample 1, except adding 90 parts by weight of $LiCo_{0.98}Al_{0.01}Ni_{0.01}O_2$, as cathode active material, in the preparation of a cathode mixture.

Comparative Example 3 (Sample 14)

A solid electrolyte cell having a gelated solid electrolyte was prepared in the same way as in sample 1, except adding 90 parts by weight of $LiNiO_2$ as cathode active material, in the preparation of a cathode mixture.

Comparative Example 4 (Sample 15)

A solid electrolyte cell was prepared in the same way as in sample 1, except adding 90 parts by weight of $LiNi_{0.9}Co_{0.1}O_2$, as cathode active material, in the preparation of a cathode mixture.

Comparative Example 5 (Sample 16)

A solid electrolyte cell having a gelated solid electrolyte was prepared in the same way as in sample 1, except adding 90 parts by weight of $LiMn_2O_4$ as cathode active material, in the preparation of a cathode mixture.

Comparative Example 6 (Sample 17)

A solid electrolyte cell was prepared in the same way as in sample 1, except adding 90 parts by weight of $LiMn_{1.95}Fe_{0.05}O_4$, as cathode active material, in the preparation of a cathode mixture.

Comparative Example 7 (Sample 18) Completely Solid

A solid electrolyte cell having a gelated solid electrolyte was prepared in the same way as in sample 1, except adding 90 parts by weight of $LiCoO_2$ as cathode active material, in the preparation of a cathode mixture.

The solid electrolyte cells of the samples 1 to 18, prepared as described above, were put to charging/discharging tests.

Charging/Discharging Tests

First, initial charging/discharging was carried out using a potentio-galvanostat. At 90 mA, constant current charging was started, and switched to constant voltage charging when the closed circuit voltage reached 4.2V. The charging was finished at a time point when eight hours have elapsed since the start of charging. At 90 mA, constant current discharge was carried out. At a time point the closed circuit voltage reached 3V, discharge was finished and measurement was made of the initial discharge capacity.

Then, after charging under the same condition as that for initial charging, constant current discharge was carried out at 90 mA. At a time point the closed circuit voltage reached 0V, that is after overdischarge, the discharge was finished and the samples being tested were allowed to stand for 240 hours in an environment of 25° C.

Then, after charging under the same condition as that for initial charging, constant current discharge was carried out at 90 mA. At a time point the closed circuit voltage reached 3V, discharge was finished and measurement was made of the discharge capacity of the third cycle, that is the discharge capacity following overdischarge.

The discharge capacity upkeep ratio, as the ratio of the discharge capacity following discharge to the initial discharge capacity, was found.

On the other hand, the possible presence of swollen state of the laminate film caused by gas evolution was checked visually after the charging/discharging test.

The measured results are shown in Table 1.

TABLE 1

|  | initial discharge capacity (m/Ah) | discharge capacity of third cycle (mAh) | discharge capacity upkeep ratio (%) | swelling of exterior material |
|---|---|---|---|---|
| sample 1 | 465 | 464 | 99.8 | none |
| sample 2 | 456 | 454 | 99.6 | none |
| sample 3 | 454 | 451 | 99.3 | none |
| sample 4 | 442 | 440 | 99.5 | none |
| sample 5 | 445 | 443 | 99.6 | none |
| sample 6 | 460 | 455 | 98.9 | none |
| sample 7 | 458 | 455 | 99.3 | none |
| sample 8 | 452 | 448 | 99.1 | none |
| sample 9 | 452 | 449 | 99.3 | none |
| sample 10 | 459 | 455 | 99.1 | none |
| sample 11 | 423 | 410 | 96.9 | none |
| sample 12 | 453 | 154 | 40.0 | swollen |
| sample 13 | 440 | 122 | 27.7 | swollen |
| sample 14 | 457 | 237 | 51.9 | swollen |
| sample 15 | 458 | 189 | 41.3 | swollen |
| sample 16 | 450 | 114 | 25.3 | swollen |
| sample 17 | 448 | 135 | 30.1 | swollen |
| sample 18 | 420 | 63 | 15.0 | swollen |

As may be seen from Table 1, the solid electrolyte cells of the samples 1 to 11, having cathodes containing a compound represented by the general formula $Li_xFe_{1-y}M_yPO_4$, where M is at least one selected from the group consisting of Mn, Cr, Co, Cu, Ni, V, Mo, Ti, Zn, Al, Ga, Mg, B and Nb, $0.05 \leq x \leq 1.2$ and $0 \leq y \leq 0.8$, as the cathode active material, exhibit a high discharge capacity upkeep ratio even on overdischarge up to the cell voltage of 0V. Additionally, with the solid electrolyte cells of the samples 1 to 11, the laminate film undergoes no swelling even after overdischarge up to the cell voltage of 0V. Moreover, similar favorable effects may be derived no mater which of a gelated solid electrolyte and completely solid electrolyte is used as a solid electrolyte.

Conversely, the solid electrolyte cells of the samples 12 to 18, not containing $Li_xFe_{1-y}M_yPO_4$ but containing only known cathode active materials, are not practically useful because the discharge capacity following overdischarge is deteriorated appreciably. With the solid electrolyte cells of samples 12 to 18, gases are evolved due to charging following overdischarge up to the cell voltage of 0V, so that the laminate film was swollen. That is, with the solid electrolyte cells of the samples 12 to 18, the shape of the cell, encapsulated in the laminate film, cannot be maintained due to gases evolved on charging following overdischarge. Reports by researchers indicate that the cell thickness was increased to not less than 1.5 times the cell thickness prior to charging/discharging test.

The solid electrolyte cells of the samples 1 to 18 following the charging/discharging test were dismantled to take out and inspect the wound electrode unit. No noteworthy changes were observed with the wound electrode units of the samples 1 to 11. Conversely, with the wound electrode units of the samples 12 to 18, the anode current collectors of copper were corroded such that there could be noted portions of the layer of the anode active material detached from the anode current collector or portions where copper was precipitated on the anode active material.

Consequently, it may be seen that, with the solid electrolyte cells, provided with a cathode containing $Li_xFe_{1-y}M_yPO_4$, corroding reactions of copper used as the anode current collector may be prohibited, so that the optimum cell performance may be achieved even after overdischarge up to the cell voltage of 0V, while the shape of the cell encapsulated in the laminate film may also be maintained.

The average discharge voltage at the time of initial discharge in the solid electrolyte cells of the samples 1 to 11 is shown in Table 2.

TABLE 2

|  | average discharge voltage (V) |
| --- | --- |
| sample 1 | 3.2 |
| sample 2 | 3.7 |
| sample 3 | 3.8 |
| sample 4 | 3.7 |
| sample 5 | 3.8 |
| sample 6 | 3.6 |
| sample 7 | 3.6 |
| sample 8 | 3.8 |
| sample 9 | 3.8 |
| sample 10 | 3.3 |
| sample 11 | 3.6 |

It may be seen from Table 2 that the solid electrolyte cells of the samples 2 to 9 and the sample 11 containing, as cathode active material, at least one of lithium cobalt composite oxides, lithium nickel composite oxides and lithium manganese composite oxides and the compound represented by the general formula $Li_xFe_{1-y}M_yPO_4$ are higher in average discharge capacity at the time of initial discharge than the solid electrolyte cells of the samples 1 and 10 having a cathode containing only the compound represented by the general formula $Li_xFe_{1-y}M_yPO_4$ as the cathode active material.

Consequently, it may be seen that, with the use of a compound represented by the general formula $Li_xFe_{1-y}M_yPO_4$ as the cathode active material in conjunction with at least one of lithium cobalt composite oxides, lithium nickel composite oxides and lithium manganese composite oxides and having a discharge potential nobler than this $Li_xFe_{1-y}M_yPO_4$, a solid electrolyte cell with a higher average discharge voltage may be achieved, thus achieving a solid electrolyte cell that may operate satisfactorily when a high voltage is required, as when the cell is used as a power source for the portable telephone set.

What is claimed is:

1. A solid electrolyte cell comprising:

a cathode containing a compound represented by the general formula $Li_xFe_{1-y}M_yPO_4$ where $0.05 \leq x \leq 1.2$, $0 \leq y \leq 0.8$, and M is at least one selected from the group consisting of Mn, Cr, Co, Cu, Ni, V, Mo, Ti, Zn, Al, Ga, Mg, B and Nb;

an anode; and a solid electrolyte;

wherein an electrode unit comprised of said cathode and the anode are layered together with interposition of said solid electrolyte is encapsulated with a laminate film; and wherein said cathode contains, as a cathode active material having a discharge potential nobler than that of the compound represented by the general formula $Li_xFe_{1-y}M_yPO_4$, at least one of a compound represented by the general formula $Li_xCo_{1-y}M_yO_2$, where $0<x<2$, $0 \leq y<1$ and M is at least one selected from the group consisting of Ni, Fe, Mn, Cu, Zn, Al, Sn, B, Ga, Cr, V, Ti, Mo, W, Mg, Ca, Sr and Hb, a compound represented by the general formula $Li_xNi_{1-y}M_yO_2$, where $0<x<2$, $0 \leq y<1$ and M is at least one selected from the group consisting of Co, Fe, Mn, Cu, Zn, Al, Sn, B, Ga, Cr, V, Ti, Mo, W, Mg, Ca, Sr and Hb, and a compound represented by the general formula $Li_xMn_{2-y}M_yO_4$, where $0<x<2$, $0 \leq y<2$ and M is at least one selected from the group consisting of Ni, Fe, Co, Cu, Zn, Al, Sn, B, Ga, Cr, V, Ti, Mo, W, Mg, Ca, Sr and Hb.

2. The solid electrolyte cell according to claim 1 wherein the compound represented by the general formula $Li_xFe_{1-y}M_yPO_4$.

3. The solid electrolyte cell according to claim 1 wherein said solid electrolyte is gelated solid electrolyte.

4. The solid electrolyte cell according to claim 1 wherein said solid electrolyte is a completely solid electrolyte.

* * * * *